US011192652B1

(12) United States Patent
Udriste et al.

(10) Patent No.: US 11,192,652 B1
(45) Date of Patent: Dec. 7, 2021

(54) PASSENGER SEAT DRESS COVER WITH INTEGRATED ADJUSTABLE LUMBAR SUPPORT DEVICE

(71) Applicant: B/E AEROSPACE, INC., Winston-Salem, NC (US)

(72) Inventors: Daniel Udriste, Winston-Salem, NC (US); Neil Ralph, Winston-Salem, NC (US); Charles Zurian, Kernersville, NC (US); Lazaro Martinez, Clemmons, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/931,320

(22) Filed: Jul. 16, 2020

(51) Int. Cl.
  *A47C 7/46* (2006.01)
  *B64D 11/06* (2006.01)
  *A47C 31/11* (2006.01)

(52) U.S. Cl.
  CPC .......... *B64D 11/0639* (2014.12); *A47C 7/462* (2013.01); *A47C 31/11* (2013.01); *B64D 11/0647* (2014.12)

(58) Field of Classification Search
  CPC ................................ A47C 7/462; A47C 31/11
  USPC .................. 297/228.1–229, 284.4, 284.7
  See application file for complete search history.

(56) References Cited

U.S. PATENT DOCUMENTS

| 2,905,230 | A | * | 9/1959 | Gabriel | B60N 2/809 |
| | | | | | 297/284.7 X |
| 3,279,849 | A | * | 10/1966 | Radke | A47C 7/425 |
| | | | | | 297/284.7 X |
| 4,015,457 | A | | 4/1977 | Fukuroi | |
| 4,035,876 | A | * | 7/1977 | Takamatsu | A44B 19/26 |
| | | | | | 24/386 |
| 4,161,337 | A | | 7/1979 | Ross et al. | |
| 4,350,375 | A | | 9/1982 | Bako | |
| 4,362,334 | A | * | 12/1982 | Ross | A47C 7/405 |
| | | | | | 297/284.7 X |
| 4,514,884 | A | | 5/1985 | Kaneko | |
| 4,541,670 | A | * | 9/1985 | Morgenstern | A47C 7/462 |
| | | | | | 297/284.7 |
| 4,578,966 | A | | 4/1986 | Kasai | |

(Continued)

FOREIGN PATENT DOCUMENTS

| CN | 2129802 Y | 4/1993 |
| DE | 20316280 U1 | 2/2004 |

(Continued)

*Primary Examiner* — Rodney B White
(74) *Attorney, Agent, or Firm* — Suiter Swantz pc llo

(57) ABSTRACT

A dress cover installable over a seatback of a passenger seat and having an integrated adjustable lumbar support device is disclosed. In embodiments, the dress cover includes a fabric outer shell and a seat cushion within the outer shell. The lumbar support device is disposed inside a pocket set into the dress cover and corresponding to the lumbar area of the seat occupant. The pocket extends laterally between left-side and right-side slots, each slot held closed by a zipper within which a slider tracks up and down to adjust the lumbar support device. As the slider tracks along the zipper it opens and closes the zipper within the body of the slider, maintaining its slot in a closed configuration. By adjusting the sliders up or down, the occupant may adjust the position of the lumbar support device through the dress cover.

12 Claims, 9 Drawing Sheets

(56) References Cited

U.S. PATENT DOCUMENTS

| | | | | |
|---|---|---|---|---|
| 4,632,454 A * | 12/1986 | Naert | ...................... | B61D 33/00 |
| | | | | 297/284.4 |
| 4,718,724 A | 1/1988 | Quinton et al. | | |
| 4,722,569 A * | 2/1988 | Morgenstern | .......... | A47C 7/462 |
| | | | | 297/284.7 X |
| 4,730,871 A * | 3/1988 | Sheldon | ................. | A47C 7/462 |
| | | | | 297/284.7 |
| 4,810,034 A * | 3/1989 | Beier | ..................... | A47C 7/425 |
| | | | | 297/284.7 X |
| 4,930,323 A | 6/1990 | Terada et al. | | |
| 5,101,811 A * | 4/1992 | Brunswick | ............. | A47C 7/425 |
| | | | | 297/112 |
| 5,452,868 A | 9/1995 | Kanigowski | | |
| 5,697,130 A * | 12/1997 | Smith | .................... | A44B 19/38 |
| | | | | 24/381 |
| 5,711,575 A * | 1/1998 | Hand | ..................... | A47C 7/425 |
| | | | | 297/284.6 |
| 5,752,741 A * | 5/1998 | Bort | ....................... | B60N 2/667 |
| | | | | 297/284.7 X |
| 5,791,733 A * | 8/1998 | van Hekken | ......... | A47C 7/465 |
| | | | | 297/284.4 |
| 5,975,632 A * | 11/1999 | Ginat | ..................... | A47C 7/462 |
| | | | | 297/284.4 |
| 6,059,362 A * | 5/2000 | Lin | ........................ | A47C 7/425 |
| | | | | 297/284.4 |
| 6,079,785 A * | 6/2000 | Peterson | ................ | A47C 7/462 |
| | | | | 297/284.7 X |
| 6,189,972 B1 * | 2/2001 | Chu | ....................... | A47C 7/465 |
| | | | | 297/284.4 |
| 6,260,921 B1 * | 7/2001 | Chu | ....................... | A47C 7/465 |
| | | | | 297/284.4 |
| 6,354,662 B1 * | 3/2002 | Su | .......................... | A47C 7/46 |
| | | | | 297/284.4 |
| 6,394,546 B1 * | 5/2002 | Knoblock | ........ | A47C 1/03274 |
| | | | | 297/284.7 |
| 6,419,318 B1 * | 7/2002 | Albright | ................ | A47C 7/462 |
| | | | | 297/284.4 |
| 6,471,294 B1 * | 10/2002 | Dammermann | ......... | A47C 7/24 |
| | | | | 297/284.4 |
| 6,510,539 B1 | 1/2003 | Deemie et al. | | |
| 6,575,530 B1 * | 6/2003 | Fischer | .................. | A47C 7/282 |
| | | | | 297/284.4 X |
| 6,666,509 B2 | 12/2003 | Matsushima | | |
| 6,957,861 B1 * | 10/2005 | Chou | ..................... | A47C 3/025 |
| | | | | 297/284.7 |
| 7,104,604 B1 * | 9/2006 | Kang | ....................... | A47C 7/46 |
| | | | | 297/284.7 |
| 7,219,963 B2 | 5/2007 | Fridd | | |
| 7,255,394 B2 | 8/2007 | Ogura | | |
| 7,344,194 B2 * | 3/2008 | Maier | ...................... | A47C 7/46 |
| | | | | 297/284.4 |
| 7,516,523 B2 * | 4/2009 | Okot | .................... | A44B 19/262 |
| | | | | 24/382 |
| 7,517,024 B2 * | 4/2009 | Cvek | ...................... | A47C 7/282 |
| | | | | 297/284.4 X |
| 7,533,451 B2 | 5/2009 | Akashi et al. | | |
| 8,449,037 B2 * | 5/2013 | Behar | ..................... | A47C 7/46 |
| | | | | 297/284.4 X |
| 8,573,697 B1 * | 11/2013 | Su | .......................... | A47C 7/462 |
| | | | | 297/284.7 |
| 8,650,724 B2 | 2/2014 | King et al. | | |
| 8,991,922 B2 * | 3/2015 | Bisman | .................. | A47C 7/462 |
| | | | | 297/284.4 |
| 9,131,777 B2 * | 9/2015 | Muck | ..................... | B60N 2/666 |
| 9,155,393 B2 * | 10/2015 | Hurford | ................. | A47C 7/46 |
| 9,308,845 B2 | 4/2016 | Cortellazzi | | |
| 10,602,847 B2 * | 3/2020 | Zouzal | ..................... | B60N 2/66 |
| 10,813,463 B2 * | 10/2020 | Deevers | ................. | A47C 7/40 |
| 2008/0231095 A1 * | 9/2008 | Brauning | ................ | A47C 7/46 |
| | | | | 297/284.4 X |
| 2012/0256456 A1 * | 10/2012 | Nekrasov | ............... | B60N 2/665 |
| | | | | 297/284.7 |
| 2013/0226053 A1 | 8/2013 | Khan et al. | | |
| 2017/0361747 A1 | 12/2017 | Heffran | | |

FOREIGN PATENT DOCUMENTS

| | | | | |
|---|---|---|---|---|
| JP | | 2002325651 A | 11/2002 | |
| JP | | 2015100508 A | 6/2015 | |
| KR | | 101255929 B1 | 4/2013 | |
| WO | WO-2015006813 A1 * | | 1/2015 | ............. A47C 31/11 |

* cited by examiner

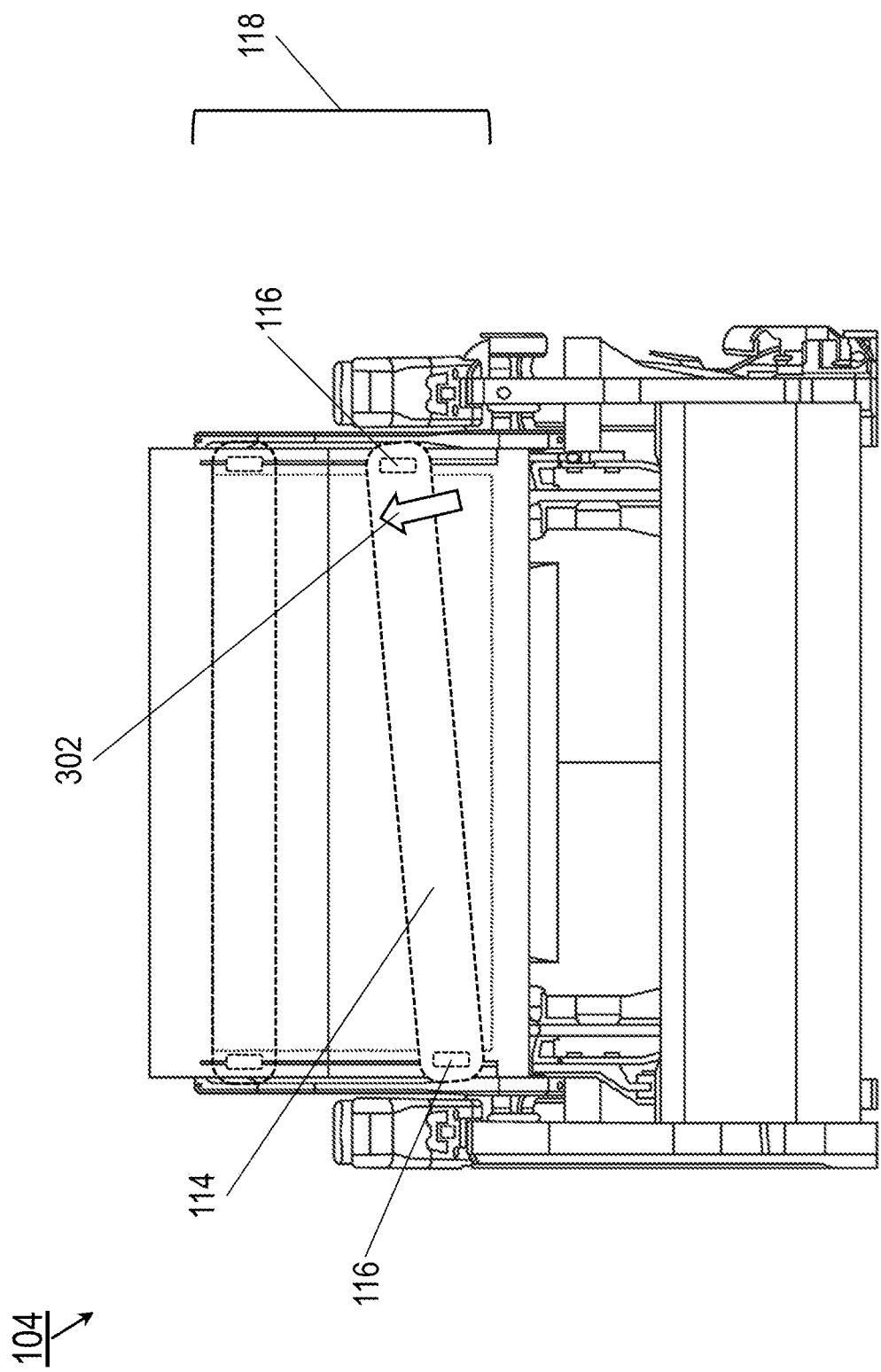

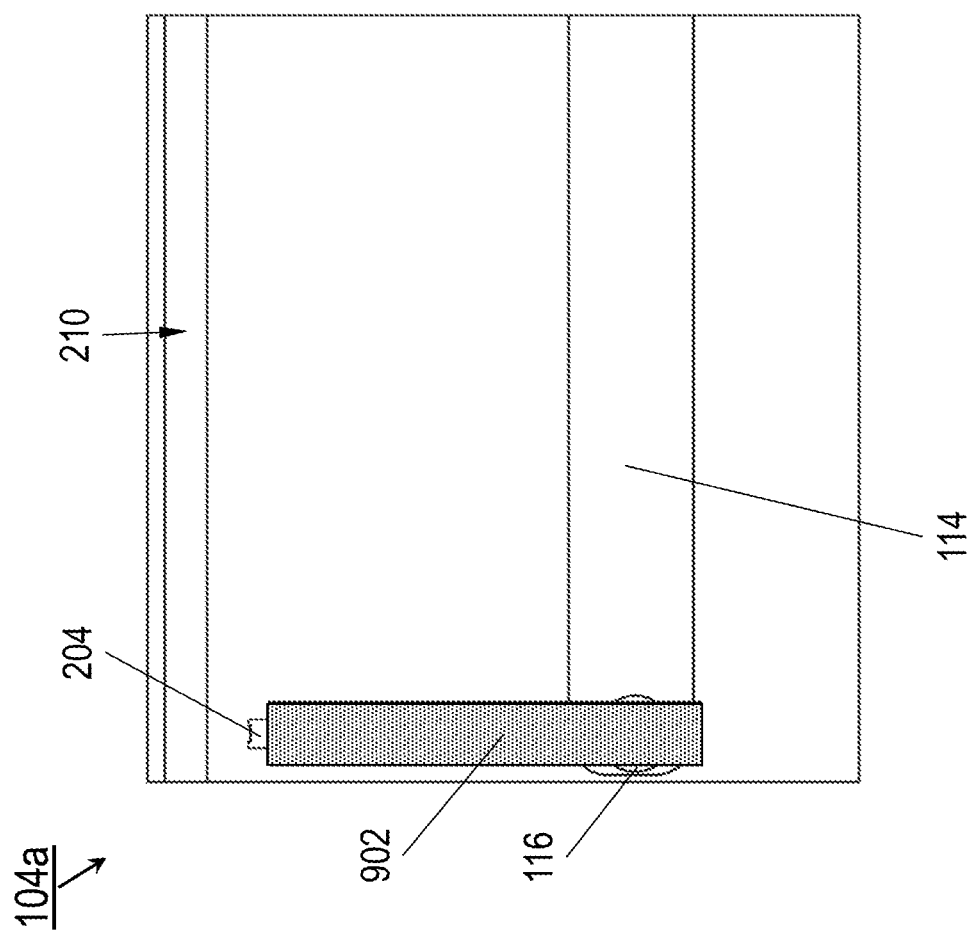
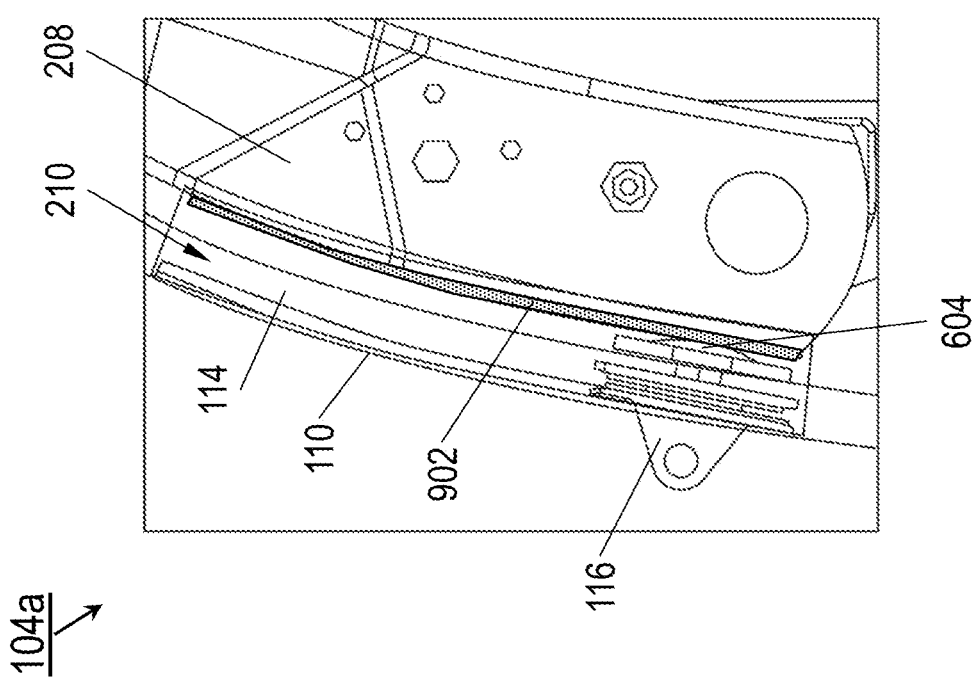

PASSENGER SEAT DRESS COVER WITH INTEGRATED ADJUSTABLE LUMBAR SUPPORT DEVICE

TECHNICAL FIELD

The subject matter disclosed herein is directed generally to aircraft interiors and more particularly to passenger seating.

BACKGROUND

Economy-class seating configurations are commonly found in the main passenger cabin of commercial aircraft (e.g., as opposed to premium seating sections). These seating configurations, or seating assemblies, are generally found in groups of two to five seats depending on the cabin configuration. While these seats may be occupied by passengers for hours at a time (e.g., for long-haul transcontinental or transoceanic routes), they rarely incorporate any dedicated means of lumbar support, e.g., support for the lower region of the spine. As a result, many passengers resort to improvised means of lumbar support (e.g., pillows, clothing) with varying levels of effectiveness.

SUMMARY

A seatback dress cover having an integrated adjustable lumbar support device is disclosed. In embodiments, the dress cover is installable over the seatback of a passenger seat and includes a fabric outer shell and a seat cushion incorporated within the outer shell to support the passenger occupying the seat. The dress cover includes a pocket extending laterally through the interior of the dress cover between slots on the left and right sides, each slot kept closed by a zipper or like slide fastener. For example, the slide fastener has a zipper or like fastener track extending along both sides of the slot, and a self-closing slider translatable along the fastener track, keeping the slide fastener closed both in front of and behind the slider as it tracks. The dress cover includes a lumbar support device extending laterally within the interior pocket between the left-side and right-side slots. The lumbar support device is attached to the sliders on the left and right sides, such that the lumbar support device is adjustable by the passenger (up or down relative to the passenger's lumbar area) by manipulating the sliders.

In some embodiments, the interior pocket is disposed between the outer shell and the seat cushion.

In some embodiments, the slide fasteners are zippers.

In some embodiments, the lumbar support device is pivotably attached to the sliders on the left and right sides.

In some embodiments, each slider includes a flexible pull attached thereto for easier manipulation by the passenger.

In some embodiments, the flexible pull is attached to each slider at a single point.

In some embodiments, each slider includes an elongated slot aligned with the direction of translation (e.g., "up" and "down" relative to the left-side or right-side slot), the flexible pull tied to or otherwise attached to the elongated slot.

In some embodiments, each slider incorporates a finger pull or handle, the lumbar support device adjustable by the occupying passenger via the left-side and right-side finger pulls.

In some embodiments, the sliders are attached to either side of the front of the lumbar support device and fastened to the lumbar support device by fasteners attached at the rear.

In some embodiments, the dress cover includes flexible translation strips within the pocket on the left and right sides. The flexible strips facilitate adjusting of the lumbar support device by slidably engaging with the fasteners behind the lumbar support device.

In some embodiments, the flexible translation strips extend perpendicular to the lumbar support device.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 3 is a forward interior view of the passenger seat of FIG. 1;

FIG. 9A is a side interior view of the dress cover of FIG. 1;

and FIG. 9B is a rear interior view of the dress cover of FIG. 9A.

DETAILED DESCRIPTION

Figure 1:
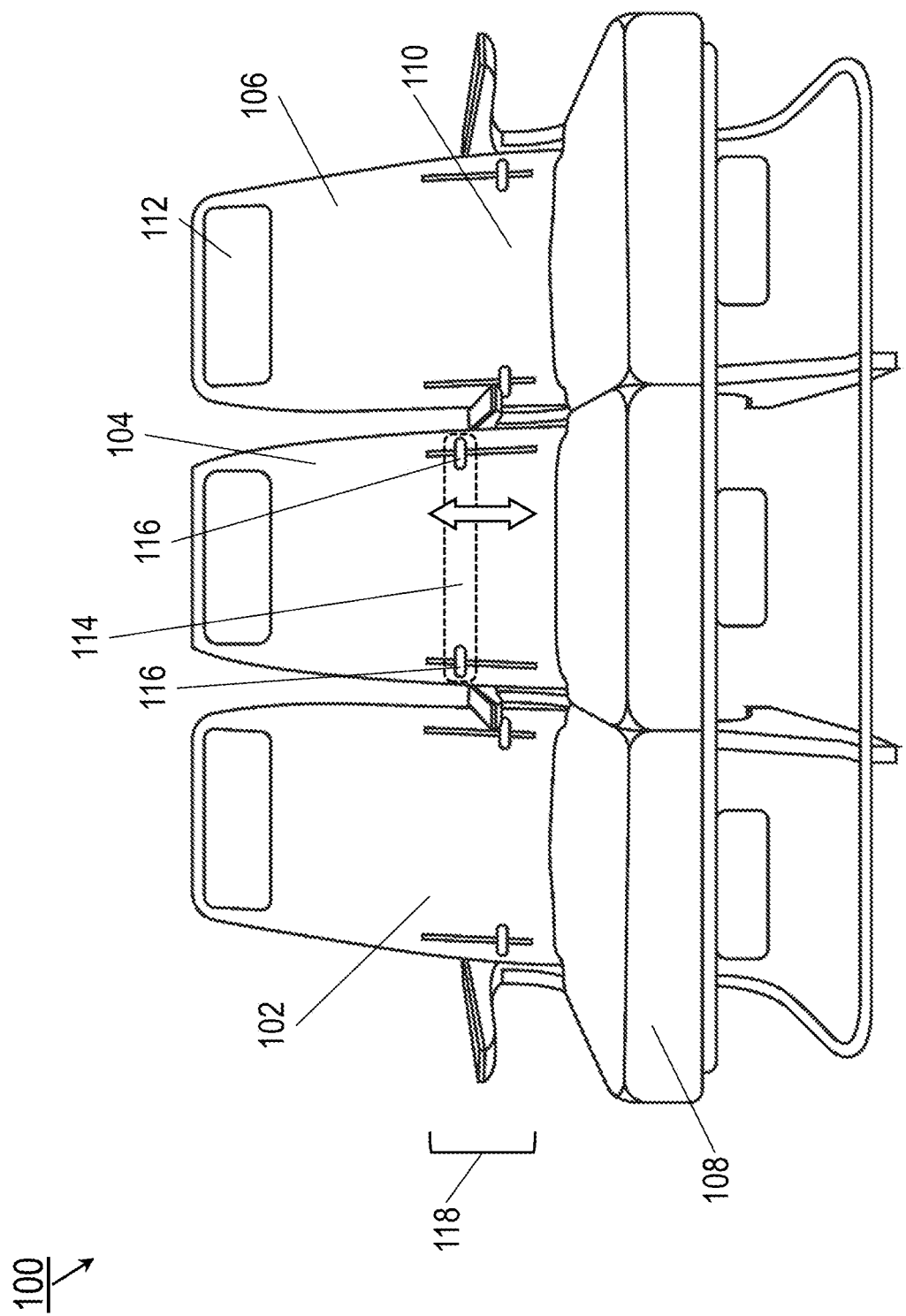
FIG. 1 is a forward view illustrating a passenger seat in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a dress cover installable over the seatback of an economy-class passenger seat. The dress cover incorporates a lumbar support device adjustable by the occupying passenger via sliders on either side of the dress cover. The dress cover provides retrofittable, adjustable lumbar support for economy-class passengers at a relatively low level of complexity.

Referring to FIG. 1, a passenger seating assembly 100 is disclosed. The passenger seating assembly may comprise a group of individual passenger seats 102, 104, 106.

In embodiments, the passenger seat 104 (and, similarly, the passenger seats 104, 106) may include a seat cushion 108 and dress cover 110; the dress cover may include a headrest 112 incorporated into or attached to the dress cover proximate to the head of a passenger occupying the passenger seat. The dress cover 110 may be installed over a seatback of the passenger seat 104, substantially covering the upper portion of the passenger seat. For example, the dress cover 110 may replace an existing dress cover and thereby provide the passenger seat 104 with adjustable lumbar support capability.

In embodiments, the dress cover 110 may include a fabric outer shell and, within the outer shell, an adjustable lumbar support device 114 (e.g., lumbar support bar, lumbar support strap). The lumbar support device 114 may be adjusted through the dress cover 110 by the occupying passenger via sliders 116 on the left and right sides of the dress cover. By adjusting the lumbar support device 114 up or down via the sliders 116 along a range 118 corresponding to the lower spine or back area, the passenger may customize the lumbar support provided by the passenger seat 104 to a personalized level of comfort.

In some embodiments, the lumbar support device 114 may be fashioned of heavy-duty self-extinguishing thermoset plastic or composite flame-retardant components that may bend or flex to some degree to accommodate an occupying passenger. The precise shape, dimensions, and/or thickness of the lumbar support device 114 may be customized according to, e.g., the dimensions of the passenger seat 104 or the degree of lumbar support desired.

Figure 2A:
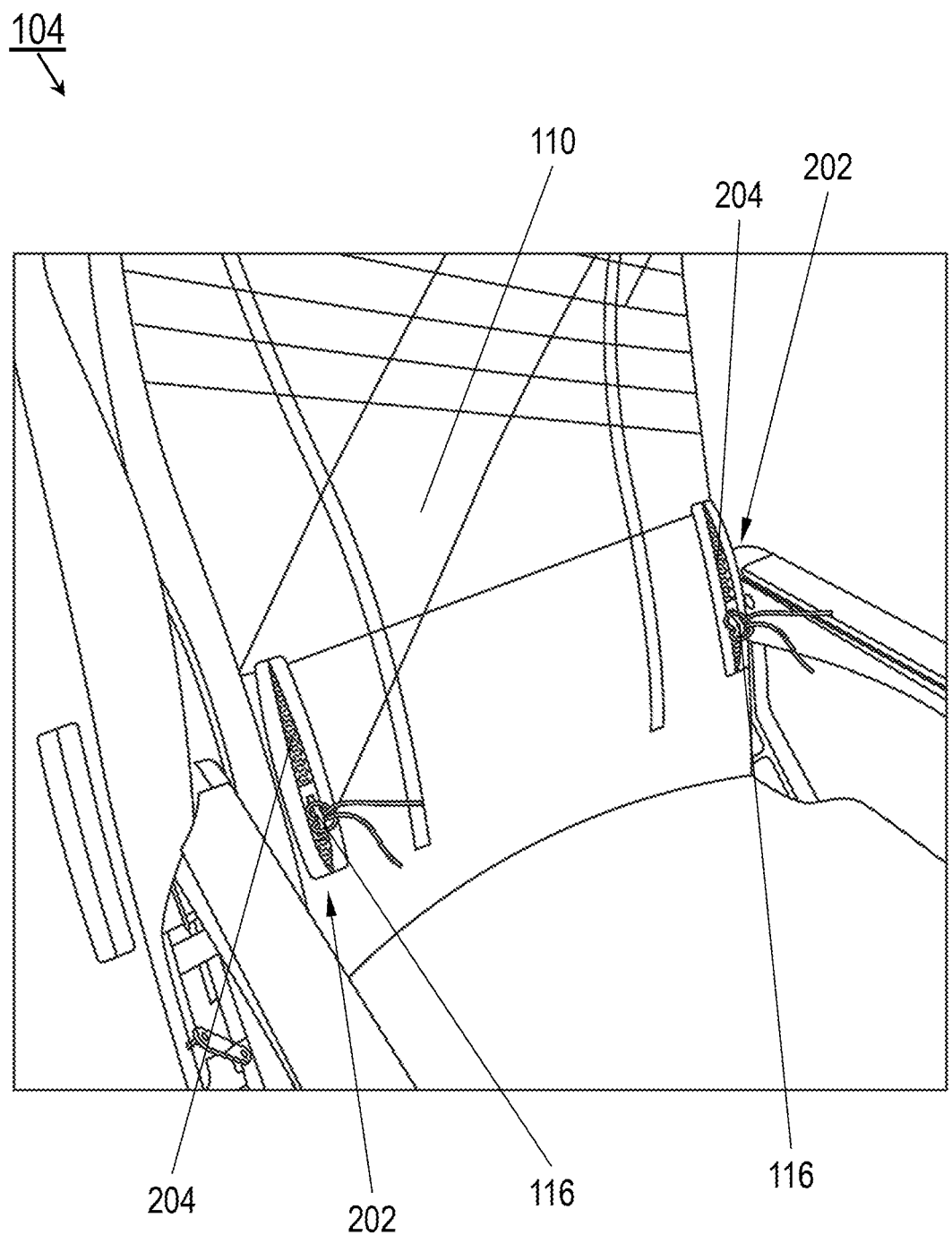
FIG. 2A is an isometric view of a dress cover of the passenger seat of FIG. 1.

Referring to FIG. 2A, the passenger seat 104 is disclosed.

In embodiments, the dress cover 110 may include two slots 202 set respectively into the left and right sides of the dress cover, substantially proximate to the lumbar region of the passenger occupying the passenger seat 104. For example, the slots 202 may be held together by zippers 204 (e.g., or any other appropriate toothed-type, coil-type, or constant extruded section-type slide fastener). In embodiments, the zippers 204 are maintained in a closed position by sliders 116 capable of tracking up or down along the length of the slots 202. For example, by manipulating the sliders 116 up or down, the occupying passenger may adjust the level of the lumbar support bar (114, FIG. 1) to any desired height along the length of the slots 202.

Figure 2C:
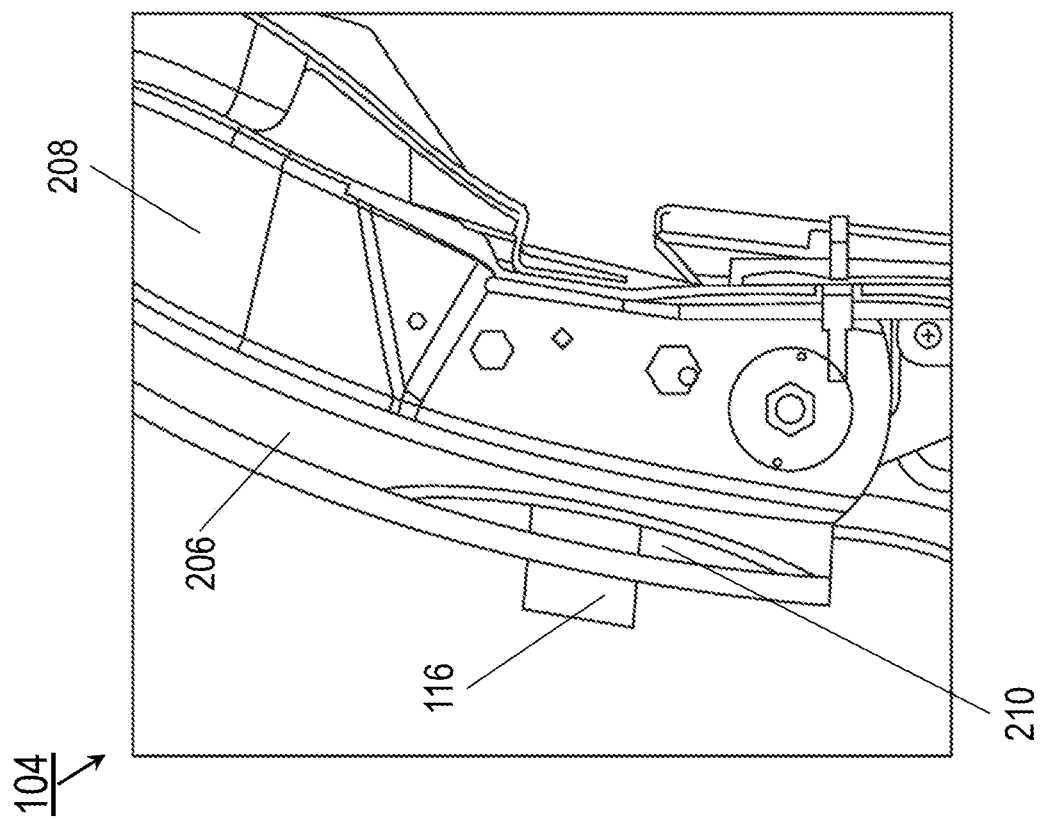
FIGS. 2B and 2C are side interior views of the passenger seat of FIG. 1.
Figure 2B:
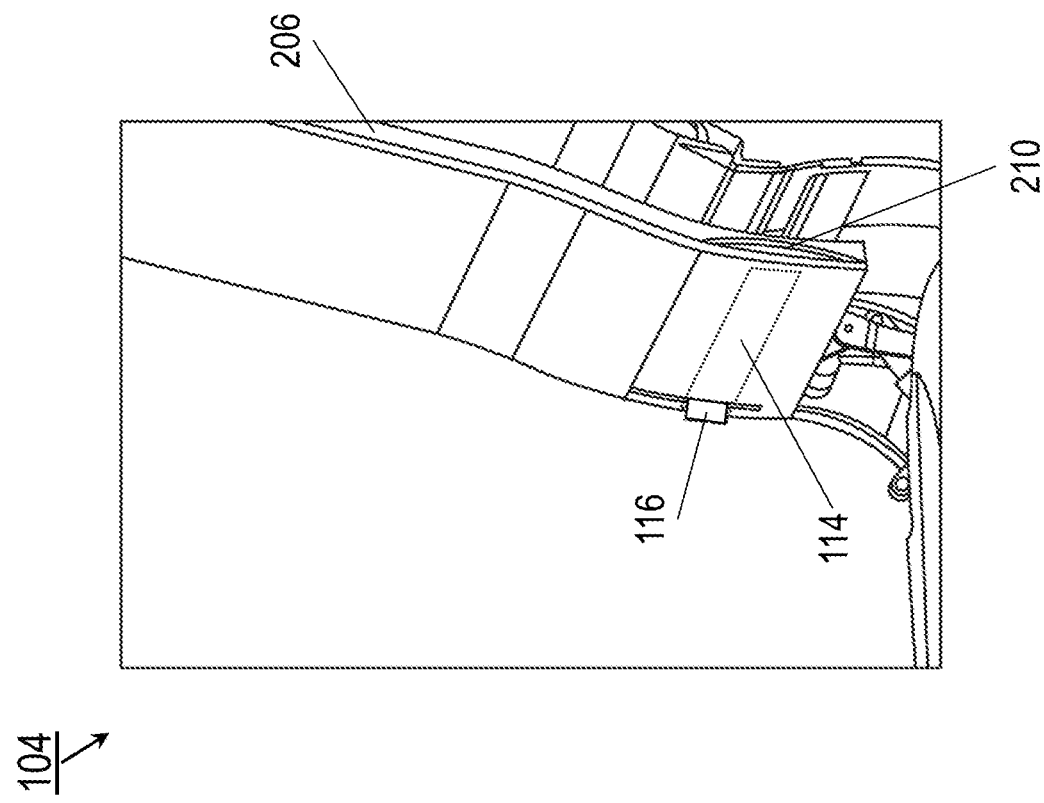

Referring also to FIGS. 2B and 2C, the passenger seat 104 is disclosed.

In embodiments, the dress cover (110, FIG. 2A) may include within its outer shell a seatback cushion 206 capable of providing padding against the seatback 208 of the passenger seat 104. Between the seatback cushion 206 and the outer shell of the dress cover 110, a pocket 210 may be disposed (e.g., corresponding to the length of the slots (202, FIG. 2A) and to the lumbar region of the occupying passenger. For example, the lumbar support device 114 may be situated within the pocket 210 and may be adjusted (e.g., via the sliders (116, FIG. 2A) up and down along the height of the pocket to customize lumbar support to the desired level of comfort.

In embodiments, the sliders 116 may maintain the zippers (204, FIG. 2A) in a closed position at any position of the lumbar support bar, preventing the occupying passenger from accessing or otherwise tampering with the pocket 210 (e.g., causing damage to the inner mechanicals of the passenger seat 104, concealing objects within the pocket).

Referring to FIG. 3, the passenger seat 104 is disclosed.

In embodiments, the lumbar support device 114 may be pivotably attached to the sliders (116, FIG. 1) on either end of the dress cover (110, FIG. 1) to facilitate adjustment of the lumbar support device throughout its effective range 118. For example, pivotal attachment of the sliders 116 to the lumbar support device 114, as additionally discussed below, may allow uneven or non-vertical adjustment (302) of a slider to more easily translate into up-and-down adjustment of the lumbar support device without racking or other complications.

Figure 4:
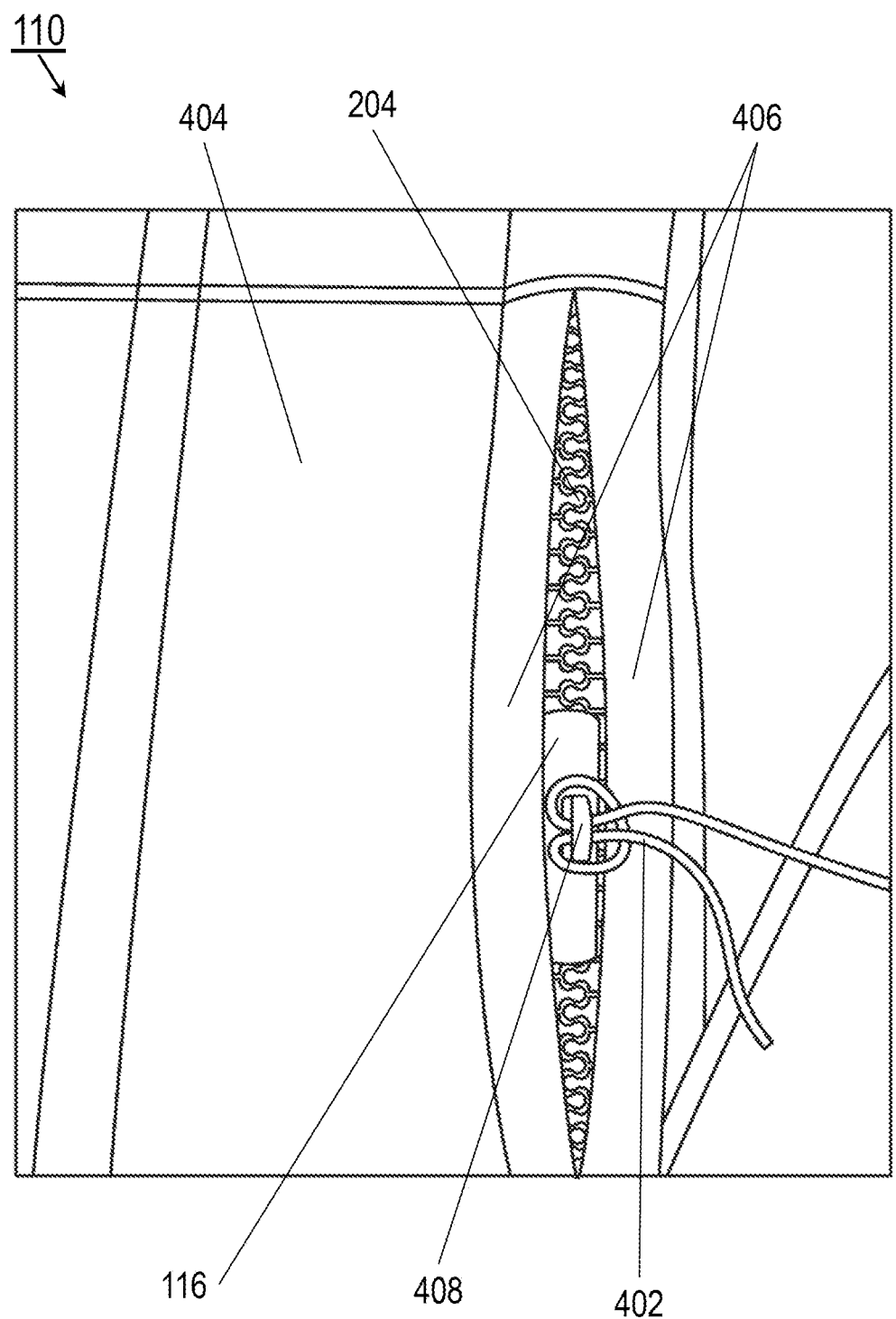
FIG. 4 is a detailed view of the dress cover of FIG. 1.

Referring to FIG. 4, the dress cover 110 is disclosed.

In embodiments, the slider 116 may be translated along the zipper 204 by a flexible pull 402 (e.g., cord, string, cable). For example, the fabric outer shell 404 of the dress cover 110 may include hems 406 configured to substantially conceal the zipper 204 from view. The sliders 116 may similarly be partially concealed by the hems, with the exception of a loop 408 integrated into the body of the slider, the flexible pull 402 threaded through, or otherwise attached to, the loop. By articulating the flexible pull 402, the passenger may articulate the slider 116 along the zipper 204 and thereby manipulate the lumbar support bar (114, FIG. 1) through the dress cover 110. Simultaneously, the passenger is prevented from accessing the pocket (210, FIG. 2A) through the slot 202 and, e.g., potentially damaging mechanical elements of the passenger seat (102, FIG. 1) or concealing objects within the pocket.

Figure 5B:
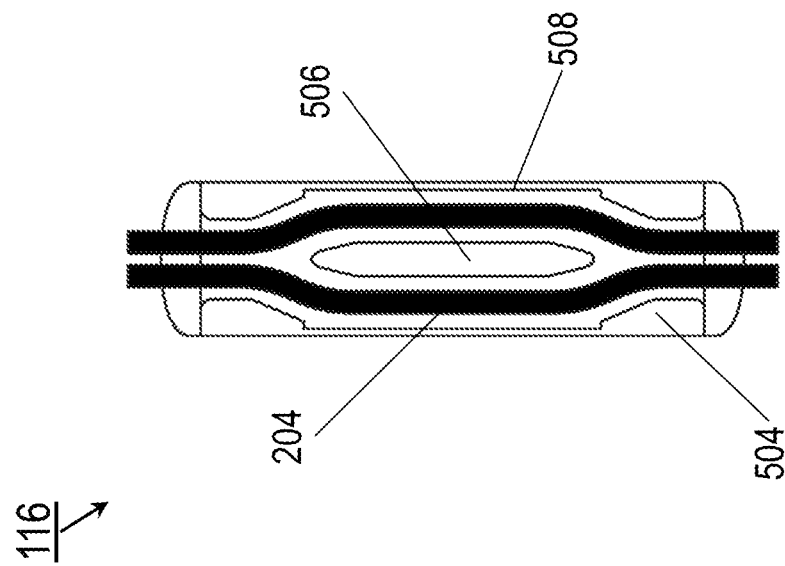
FIG. 5B is an overhead view of the slider of FIG. 5A.
Figure 5A:
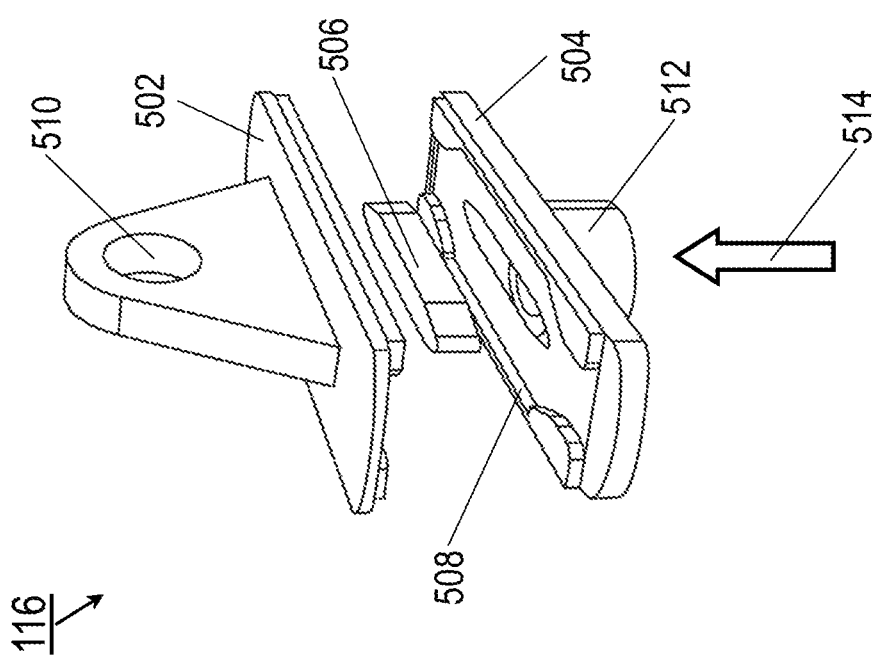
FIG. 5A is an isometric view of a slider of the dress cover of FIG. 1.

Referring to FIGS. 5A and 5B, the slider 116 is disclosed.

In embodiments, the slider 116 may comprise a top board 502, a bottom board 504, and a columniation 506 within a single solid body, the columniation disposed between the top and bottom boards. For example, the slider 116 generally, and the columniation 506 in particular, may be distinguished from conventionally understood zippers in that rather than opening a zipper when articulated in one direction and closing the zipper when articulated in the opposing direction (as would be the case with a conventional zipper slider), the columniation 506 opens, and then closes, the zipper 204 within the body of the slider. In this way, the zipper 204 may be maintained in a closed configuration throughout (preventing access to the pocket (210, FIG. 2A) as described above) and allowing the manipulation of objects within the pocket (e.g., the lumbar support bar (114, FIG. 1). Further, the slider 116 may incorporate interior sidewalls 508 for constraining the separated edges of the zipper 204 within the body of the slider when in its open state.

In embodiments, the slider 116 may include a single-point pull tab 510 configured to project from the slot (202, FIG. 2A) and to which the flexible pull (402, FIG. 4) may be secured for external manipulation of the lumbar support device (114, FIG. 3). Referring in particular to FIG. 5A, the slider 116 may include a threaded lug 512 on its underside. For example, the threaded lug 512 may be inserted through a corresponding hole in the lumbar support device 114, and a screw or other like threaded fastener inserted (514) into the threaded lug to secure the slider 116 to the lumbar support device.

Figure 6A:
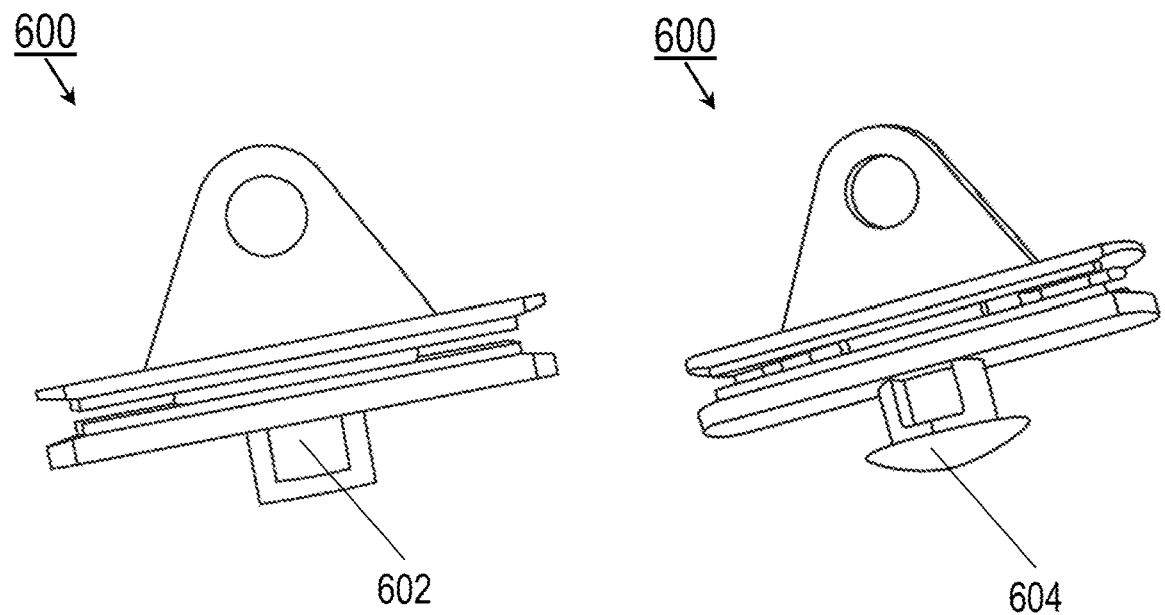
FIG. 6A is an isometric view of the slider of FIGS. 5A-C, with and without a push rivet.
Figure 6B:
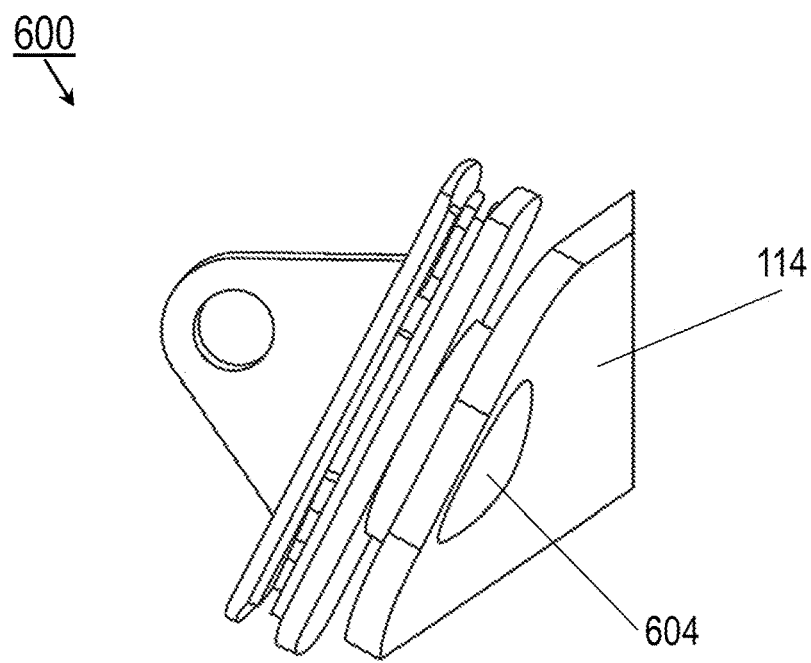
FIG. 6B is an isometric view of the slider of FIG. 6A installed into the lumbar support device of FIG. 1.

Referring to FIG. 6A, the slider 600 may be implemented and may function similarly to the slider 116 of FIGS. 1 through 5A, except that the slider 600 may incorporate a nonthreaded opening 602 configured to accommodate a push rivet 604 or like nonthreaded fasteners. Referring also to FIG. 6B, the push rivet 604 may be inserted into the nonthreaded opening 602 from the underside to secure the slider 600 to the lumbar support device 114.

Figure 7:
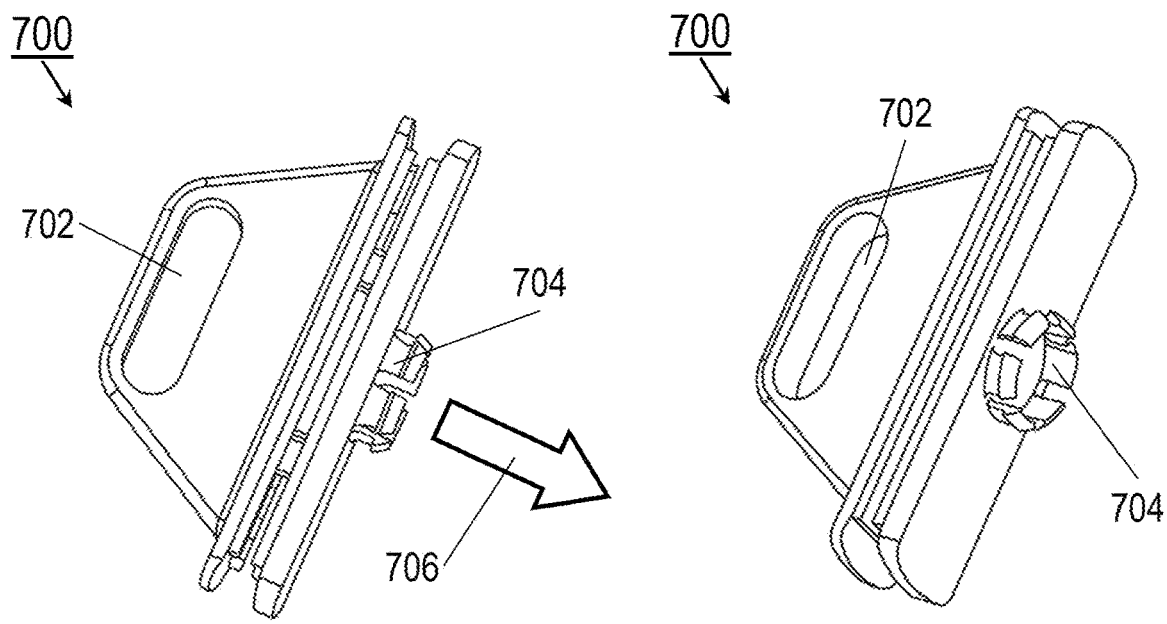
FIG. 7 is an isometric view of a slider of the dress cover of FIG. 1 incorporating an elongated slot.

Referring to FIG. 7, the slider 700 may be implement and may function similarly to the sliders 116, 600 of FIGS. 1 through 6B, except that the slider 700 may incorporate an elongated slot 702 to which the flexible pull (402, FIG. 4) may be attached. For example, the elongated slot 702 may help to align the adjustment of the lumbar support device (114, FIG. 3) via the slider 700 and lead, instead of pushing, the slider through the zipper (204, FIG. 4), providing smoother motion of the slider in both directions.

In embodiments, the slider 700 (or the sliders 116, 600) may incorporate on its underside a push-in snap attachment 704. For example, the push-in snap attachment 704 may be pushed (706) into a corresponding hole through the lumbar support device 114, allowing the slider 700 to secure to the lumbar support device without the need for an additional fastener (e.g., the push rivet 604, FIG. 6A-B) or other additional hardware.

Figure 8:
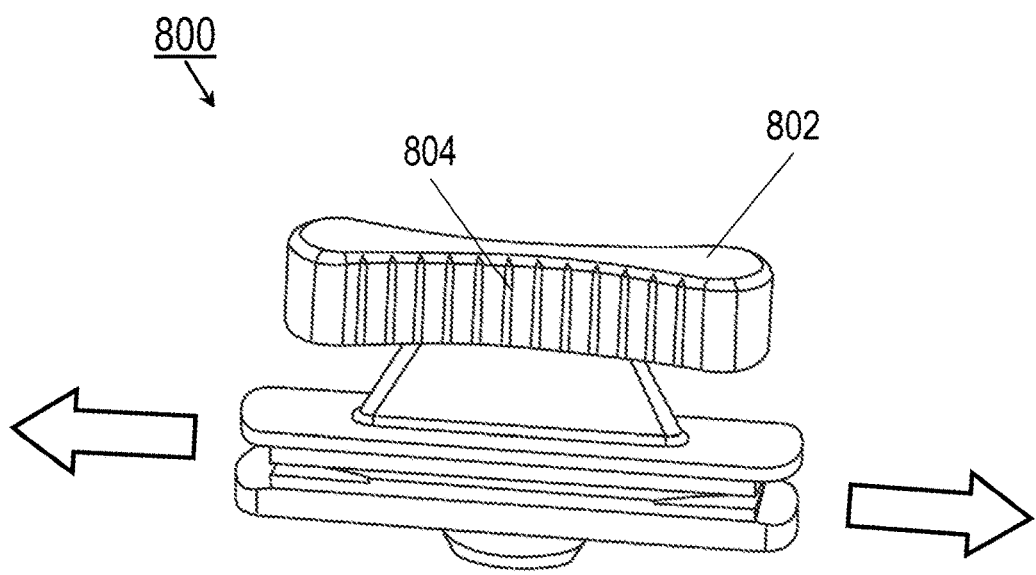
FIG. 8 is an isometric view of a slider of the dress cover of FIG. 1 incorporating a pull handle.

Referring now to FIG. 8, the slider 800 may be implemented and may function similarly to the sliders 116, 600, 700 of FIGS. 1 through 7, except that the slider 800 may incorporate a finger pull 802 (e.g., handle) directly manipulable by the passenger to adjust the lumbar support device (114, FIG. 3). For example, rather than attach a flexible pull (402, FIG. 4), the finger pull 802 may provide additional grip (e.g., texturing 804) to facilitate use by the passenger.

Referring to FIGS. 9A and 9B, the passenger seat 104a may be implemented and may function similarly to the passenger seat 104 of FIG. 1, except that the passenger seat 104a may incorporate within the dress cover 110 a translation strip 902.

In embodiments, the translation strip 902 may be disposed within the pocket 210 between the lumbar support device 114 and the seatback 208. For example, the translation strip 902 may be fashioned of flexible plastic or other approved materials having a generally low friction coefficient. The translation strip 902 may be situated, on the left and right sides of the pocket 210, directly behind the rear end of the push rivet 204 (e.g., or other hardware securing the slider 116 to the lumbar support device 114). For example, the translation strip 902 may extend substantially perpendicular to the lumbar support device 114, e.g., the lumbar support device may extend substantially laterally, or horizontally, across the dress cover 110, while the translation strip may extend substantially vertically, or aligned with the seatback 208.

In embodiments, the translation strip 902 may assist the push rivet 604, and thereby the lumbar support device 114, in smoothly translating up or down the zipper 204 as directed by the occupying passenger.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A dress cover installable over a seatback of a passenger seat, the dress cover comprising:
   a fabric outer shell configured to substantially cover the seatback;
   a seat cushion disposed within the outer shell and configured to support an occupying passenger of the passenger seat;
   and
   an interior pocket extending laterally through the dress cover from a left-side slot to a right-side slot, the left-side and right-side slots extending in parallel along the outer shell, the interior pocket proximate to a lumbar area of the occupying passenger, each of the left-side slot and the right-side slot incorporating a slide fastener comprising:
a fastener track extending along the left-side slot or the right-side slot;
and
a self-closing slider configured to 1) translate along the fastener track and 2) maintain the slide fastener in a closed configuration;
and
at least one lumbar support device disposed laterally within the interior pocket and configured to provide lumbar support to the occupying passenger, the lumbar support device attached to the self-closing sliders of the left-side slot and the right-side slot and adjustable through the dress cover by the occupying passenger via the self-closing sliders.

2. The dress cover of claim 1, wherein the interior pocket is disposed between the outer shell and the seat cushion.

3. The dress cover of claim 1, wherein:
at least one of the slide fasteners is a zipper.

4. The dress cover of claim 1, wherein:
the lumbar support device is pivotably attached to the self-closing sliders of the left-side slot and the right-side slot.

5. The dress cover of claim 1, further comprising:
a flexible pull attached to each self-closing slider, the lumbar support device adjustable by the occupying passenger via the left-side and right-side flexible pulls.

6. The dress cover of claim 5, wherein the flexible pull is attached to each self-closing slider at a single point.

7. The dress cover of claim 5, wherein:
each self-closing slider includes an elongated slot substantially aligned with the translation of the self-closing slider, the flexible pull attached to each self-closing slider via the elongated slot.

8. The dress cover of claim 1, wherein:
each self-closing slider incorporates a finger pull, the lumbar support device adjustable by the occupying passenger via the left-side and right-side finger pulls.

9. The dress cover of claim 1, wherein:
the self-closing sliders of the left-side slot and the right-side slot are attached to a front side of the lumbar support device and secured to the lumbar support device by at least one fastener attached to a rear side of the lumbar support device.

10. The dress cover of claim 9, further comprising:
one or more flexible strips disposed within the pocket and including at least a left-side strip and a right-side strip, the one or more flexible strips configured to aid in the adjusting of the lumbar support device by slidably engaging with the at least one fastener.

11. The dress cover of claim 10, wherein the one or more flexible strips extend substantially perpendicular to the lumbar support device.

12. The dress cover of claim 1, wherein the outer shell includes one or more hems configured to at least partially conceal the left-side slot or the right-side slot.

* * * * *